(12) United States Patent
Bohizic et al.

(10) Patent No.: US 7,757,129 B2
(45) Date of Patent: Jul. 13, 2010

(54) GENERALIZED TRACE AND LOG FACILITY FOR FIRST ERROR DATA COLLECTION

(75) Inventors: Theodore J. Bohizic, Hyde Park, NY (US); Richard T. Brandle, Dallas, TX (US); Gary R. Morrill, Shrewsbury, MA (US)

(73) Assignee: International Business Machines Corporation, Armonk, NY (US)

( * ) Notice: Subject to any disclaimer, the term of this patent is extended or adjusted under 35 U.S.C. 154(b) by 572 days.

(21) Appl. No.: 11/694,228

(22) Filed: Mar. 30, 2007

(65) Prior Publication Data

US 2008/0244328 A1 Oct. 2, 2008

(51) Int. Cl.
*G06F 11/00* (2006.01)
(52) U.S. Cl. .................. 714/45; 714/26; 714/38; 714/39; 714/57
(58) Field of Classification Search .................. 714/26, 714/38, 39, 45, 57
See application file for complete search history.

(56) References Cited

U.S. PATENT DOCUMENTS

| | | | | |
|---|---|---|---|---|
| 5,642,478 | A * | 6/1997 | Chen et al. | 714/45 |
| 5,887,167 | A * | 3/1999 | Sutton | 719/314 |
| 6,539,500 | B1 * | 3/2003 | Kahle et al. | 714/45 |
| 6,918,065 | B1 * | 7/2005 | Edwards et al. | 714/45 |
| 7,278,058 | B1 * | 10/2007 | Narisi | 714/38 |
| 2002/0087949 | A1 * | 7/2002 | Golender et al. | 717/124 |
| 2003/0093649 | A1 | 5/2003 | Hilton | 712/41 |
| 2006/0277441 | A1 * | 12/2006 | Edgar et al. | 714/38 |

OTHER PUBLICATIONS

"z/Architecture Principles of Operation," IBM Publication No. SA22-7832-04, Sep. 2005.
"Overview of the IBM Just-in-Time Compiler," T. Suganuma et al., vol. 30, No. 1, 2000, http://www.research.ibm.com/journal/sj/391/suganuma.html.
"A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006.
"A Dynamic Optimization Framework For A Java Just-In-Time Compiler," T. Suganuma, T. Yasue, M. Kawahito, H. Komatsu and T. Nakatani, ACM SIGPLAN, vol. 36, Issue 11, Nov. 2001.
"Memory Resource Management in VMware ESX Server," C.A. Waldspurger, In Proc. Fifth Symposium on Operating Systems Design and Implementation (OSDI '02), Dec. 2002.
Virtual Machines: Versatile Platforms For Systems and Processes (The Morgan Kaufmann Series in Computer Architecture and Design), Jim Smith and Ravi Nair, Jun. 3, 2005.

* cited by examiner

*Primary Examiner*—Robert Beausoliel
*Assistant Examiner*—Charles Ehne
(74) *Attorney, Agent, or Firm*—John E. Campbell; Kevin P. Radigan, Esq.; Heslin Rothenberg Farley & Mesiti, P.C.

(57) ABSTRACT

A generalized trace and log facility is employed to collect data, including data associated with the first occurrence of an error. The facility provides standardized application programming interfaces to be used to collect data, print the data, and forward the data to a support team, if desired.

29 Claims, 7 Drawing Sheets fig. 1 fig. 2 fig. 3 fig. 4 fig. 5 fig. 6 fig. 7 fig. 8

GENERALIZED TRACE AND LOG FACILITY FOR FIRST ERROR DATA COLLECTION

TECHNICAL FIELD

This invention relates, in general, to facilitating data collection and analysis in a processing environment, and in particular, to providing a generalized trace and log facility for first error data collection.

BACKGROUND OF THE INVENTION

Often, during processing within a processing environment, errors occur and the causes of those errors have to be determined. To facilitate this determination, information relating to the errors needs to be captured. Thus, an attempt is made to recreate the errors. Assuming the errors can be recreated, traces are turned on to collect data associated with the errors.

To assist in collecting the data, application programming interfaces are typically used. Often, each process has its own interface(s) used to collect the data and to format the data once collected. Therefore, if multiple processes collect data relating to the same error, there is no uniformity. This slows down data collection and error analysis, and negatively impacts system performance.

SUMMARY OF THE INVENTION

Based on the foregoing, a need exists for a capability to facilitate data collection. In particular, a need exists for a capability that provides data collection at the first occurrence of an error. Further, a need exists for a generalized trace and log facility that enables uniform collection of first error data.

The shortcomings of the prior art are overcome and additional advantages are provided through the provision of an article of manufacture that includes at least one computer usable medium having computer readable program code logic to facilitate data collection in a processing environment. The computer readable program code logic when executing performing, for instance, the following: preparing for data collection in the processing environment; and collecting data by a process executing within the processing environment, the data including data relating to a first occurrence of an error, the collecting employing a generalized interface facility that enables uniform collection of the data regardless of the type of process collecting the data.

Methods and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, a capability is provided for facilitating collection of data, and in particular, for facilitating first error detection collection. In one example, a generalized trace and log facility is provided that facilitates uniform collection of data associated with a first occurrence of an error. This facility is usable in various types of processing environments, including emulated environments.

Figure 1:
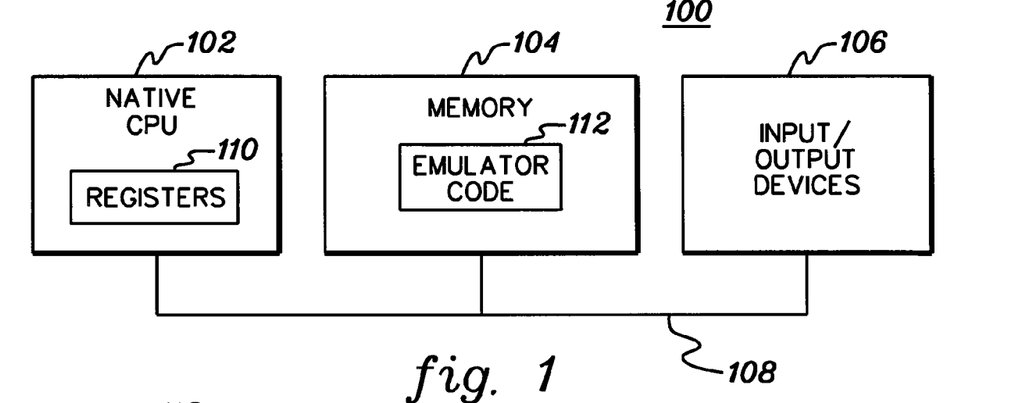
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries®, Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes emulator code 112 stored in memory 104. This code enables the processing environment configured in one architecture to emulate another architecture. For instance, emulator code 112 allows machines based on architectures other than the z/Architecture®, such as pSeries® servers, to emulate the z/Architecture® and to execute software and instructions developed based on the z/Architecture®.

Figure 2:
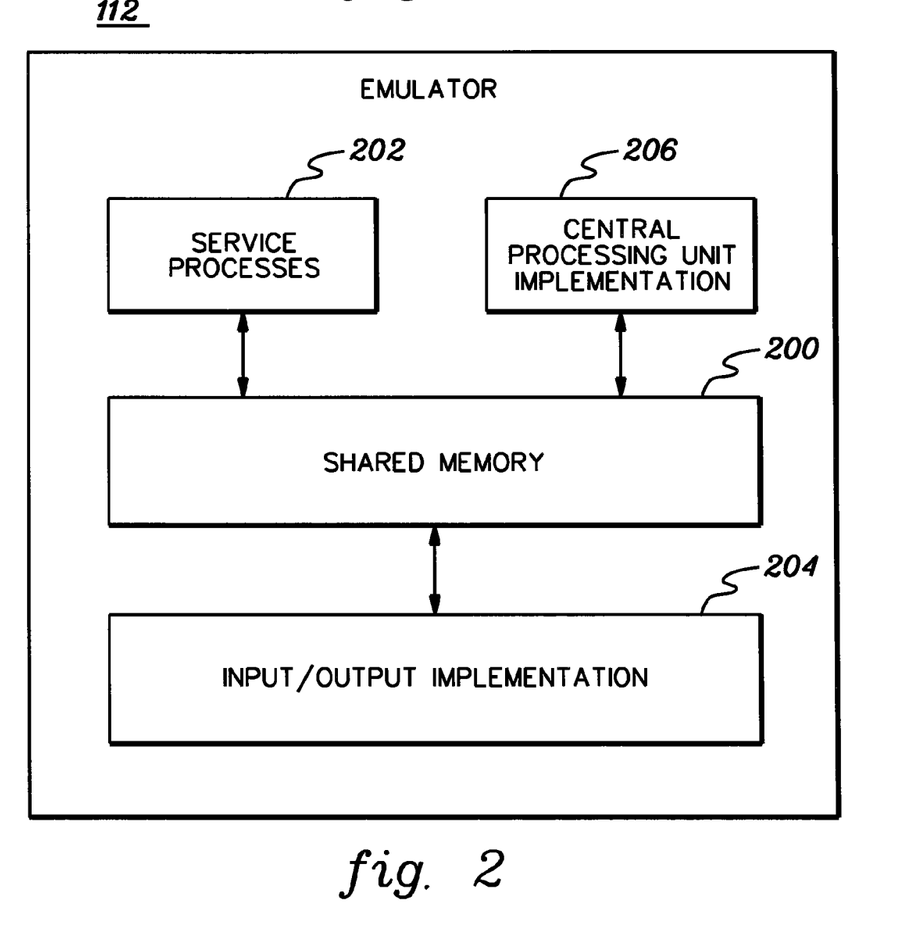
FIG. 2 depicts one embodiment of further details of the emulator of FIG. 1, in accordance with an aspect of the present invention.

Further details regarding emulator code 112 (a.k.a., emulator 112) are described with reference to FIG. 2. Emulator 112 includes a number of components used to emulate an architecture that differs from the native architecture. In this embodiment, the architecture being emulated is the z/Architecture®, but other architectures may be emulated as well. Emulator 112 includes, for instance, a shared memory 200 coupled to one or more service processes 202, an input/output (I/O) implementation 204 and a central processing unit (CPU) implementation 206, each of which is described in further detail below.

Shared memory 200 is a representation of a portion of memory in the host that is visible from service processes 202, I/O implementation 204, and CPU implementation 206. It is a storage area in which the independent processes (e.g., service processes, I/O implementation, CPU implementation) communicate by reading and storing data into the shared memory. As one example, the shared memory includes a plurality of regions including, for instance, system global information, CPU contexts and information, emulated main storage, emulated main storage keys, and subchannels (i.e., data structures that represent I/O devices).

Service processes 202 include one or more processes used to create the CPUs and one or more other processes, as well as provide architected operator facilities, such as start, stop, reset, initial program load (IPL), etc. It may also provide other functions, such as displays or alteration of emulated system facilities, obtaining/freeing shared resources, other maintenance commands, etc.

Input/output implementation 204 includes, for instance, one or more subchannel processes and an I/O controller used to communicate with I/O devices. The I/O controller is responsible for starting the subchannel processes and performing recovery.

Central processing unit implementation 206 includes one or more CPU processes, and is responsible for executing instructions and managing the processing. For example, a CPU process is responsible for obtaining one or more guest instructions from memory, providing native instructions for the guest instructions, and executing the native instructions. The guest instructions comprise software instructions (e.g., machine instructions) that were developed to be executed in an architecture other than that of native CPU 102. For example, the guest instructions may have been designed to execute on a z/Architecture® processor, but are instead being emulated on a native CPU 102, which may be, for instance, a pSeries® server.

In one example, the providing of the native instructions includes selecting a code segment in the emulator that is associated with the guest instruction. For instance, each guest instruction has an associated code segment in the emulator, which includes a sequence of one or more native instructions, and that code segment is selected to be executed.

In a further example, the providing includes creating during, for instance, a translation process, a native stream of instructions for a given set of guest instructions. This includes identifying the functions and creating the equivalent native instructions.

Figure 3:
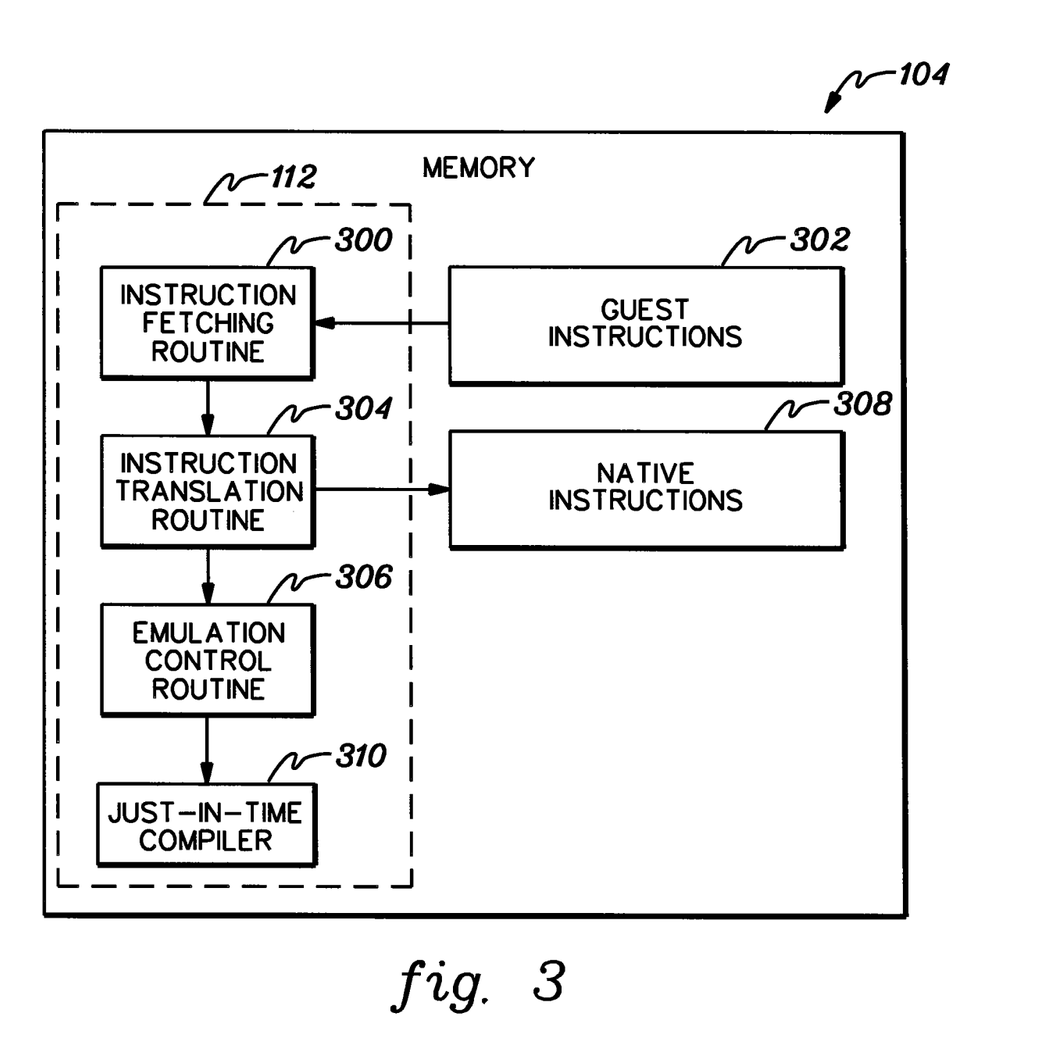
FIG. 3 depicts one embodiment of further details relating to instruction execution within the environment of FIG. 1, in accordance with an aspect of the present invention.

Additional details relating to instruction execution are described with reference to FIG. 3. In one example, emulator code 112 (and, in particular, CPU implementation 206) includes an instruction fetching routine 300 to obtain one or more guest instructions 302 from memory 104, and to optionally provide local buffering for the one or more obtained instructions. It also includes an instruction translation routine 304 to determine the type of guest instruction that has been obtained and to translate the guest instruction into one or more corresponding native instructions 308. This translation includes, for instance, identifying the function to be performed by the guest instruction and choosing the native instructions to perform that function.

Further, emulator 112 includes an emulation control routine 306 to cause the native instructions to be executed. Emulation control routine 306 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 308 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 302, native instructions 308, and emulator code 112 may reside in the same memory or may be dispersed among different memory devices.

An accumulation of instructions that have been processed by the fetch and control routines is further provided, in one embodiment, to a Just-In-Time compiler 310. The Just-In-Time compiler is a dynamic compiler that examines the instructions, looks for opportunities to remove redundancies and generates a matching sequence of instructions on the native platform on which the emulator is running. While the emulator has visibility to one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y. JAVA is a trademark of Sun Microsystems, Inc., Santa Clara, Calif.

An overview of the JAVA JIT compiler is described in "Overview of the IBM Just-in-Time Compiler," T. Suganuma et al., Volume 39, Number 1, 2000, http://www.research.ibm.com/journal/sj/391/suganuma.html, which is hereby incorporated herein by reference in its entirety. Aspects of a JIT compiler are also described in, for instance, "A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006; "A Dynamic Optimization Framework For A Java Just-In-Time Compiler," T. Suganuma, T. Yasue, M. Kawahito, H. Komatsu and T. Nakatani, ACM SIGPLAN, Volume 36, Issue 11, November 2001; and "Memory Resource Management in VMware ESX Server," C. A. Waldspurger, In Proc. Fifth Symposium on Operating Systems Design and Implementation (OSDI '02), December 2002, each of which is hereby incorporated herein by reference in its entirety.

Executing within the processing environment are a plurality of processes, such as emulated input/output (I/O) processes, emulated central processing unit processes, real I/O processes, as well as many other types of processes. One or more of these processes may wish to collect data relating to an error that has occurred within the processing environment. To facilitate this collection of data, each process (or a subset thereof) allocates one or more buffers within shared memory, as described in further detail with reference to FIG. 4.

Figure 4:
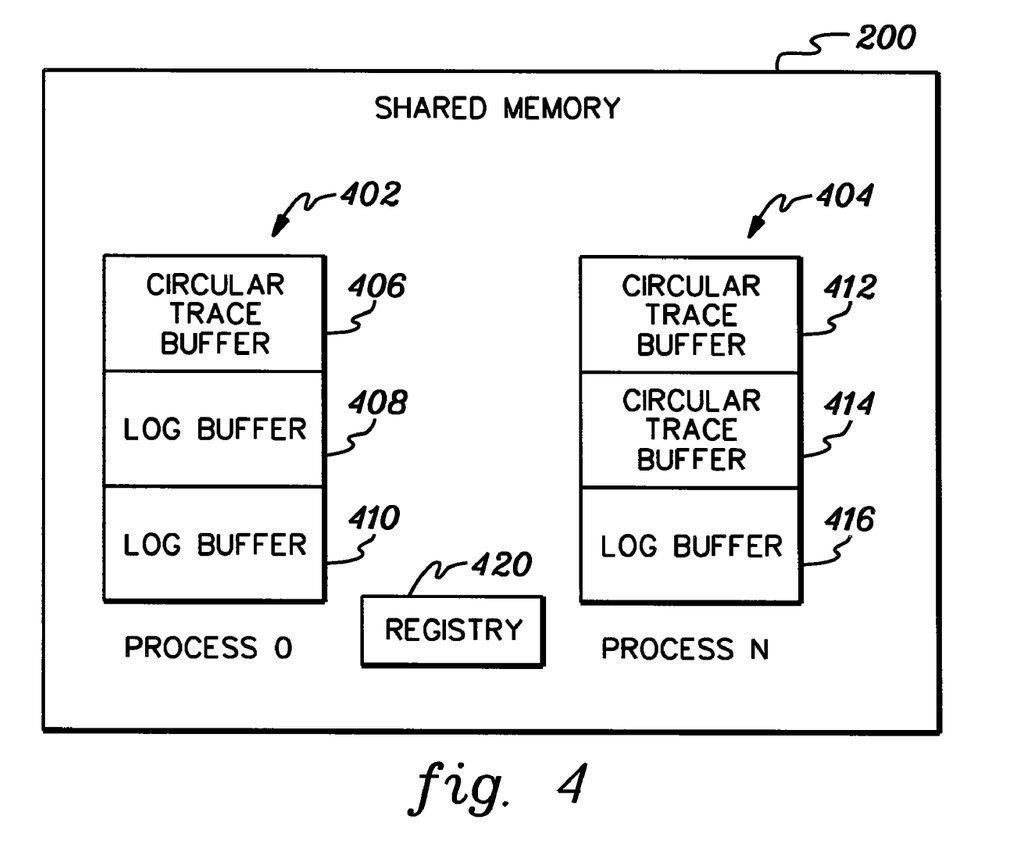
FIG. 4 depicts one embodiment of buffers used to collect first error data, in accordance with an aspect of the present invention.

As depicted in FIG. 4, within shared memory 200, a storage segment 402 has been allocated by Process 0 for Process 0, and another storage segment 404 has been allocated by Process N for Process N. Each process executing within the processing environment may allocate a storage segment used to collect data, as described herein. Each storage segment includes one or more buffers defined by the owning process. For example, storage segment 402 includes a trace buffer 406 and two log buffers 408, 410 defined for Process 0. Similarly, storage segment 404 includes two trace buffers 412, 414 and a log buffer 416 for Process N. The number and type of buffers, as well as the size of each buffer, are customizable by the owning process.

The storage segments are registered in a user shared resource registry 420 to allow access to data stored therein by external processes, such as dump processes, manual operations, system events, etc. In this example, a registry is defined for each user that has one or more processes that define storage segments. In another embodiment, there is one registry for multiple users. Registry 420 includes, for instance, the name of the storage segment; the owning processor id; a key and id used to obtain and address for the storage segment; and a length of the segment. It may also include additional information, less information or different information.

As an example, a storage segment is allocated by a process invoking an initialization function, which is part of a generalized interface facility provided in accordance with an aspect of the present invention. For example, the process invokes: int rasInit (char const *componentName, char const *subCompName, int totalSize, char const *sharedObjName), in which componentName and subCompName, together, provide a unique identifier for this storage segment. In this example, ComponentName refers to a particular class of component, such as tape, disk, etc.; and subCompName refers to a specific device within the class (e.g., TAPE1, etc.). Additionally, totalSize indicates the size of the storage to be allocated; and sharedObjectName defines a dynamic load library for the components' formatting routines, if any. If the shared object name is null, a default object name is used. In further embodiments, additional, less and/or different parameters may be specified in this function or API (application programming interface), or others described herein.

The initialization interface allocates a storage segment of the specified size in bytes, registers the area in the registry as a shared resource using a defined name that is unique within a userid, and stores any supplied shared object name.

Within the allocated segment, one or more trace buffers and/or one or more log buffers may be allocated by the process. The process defines as many trace and log buffers, as desired. If more space is requested than allocated for a log or trace area, an error code is returned.

In one example, the trace buffer is a circular buffer. Thus, when the end of the buffer is reached, it wraps around to the beginning. In one embodiment, each entry added to the buffer is timestamped. The timestamping allows merging of multiple trace buffers for multiple processes. In one example, the following application programming interface (API) is used to allocate a trace buffer: void *rasDefineTraceArea (char const *formatName, int entrySize, int entryCount, int *errCode), in which formatName is the name of the trace buffer, as well as the name of a formatting routine, if provided; entrySize is the size of the entry; entryCount indicates the number of entries to be allocated; and errCode provides a non-zero address to return any error code.

The storage for the trace buffer is assigned from the shared storage allocated using the initialization API. The process passes a character name up to, for instance, 63 characters in length; the length of each trace entry in bytes; and the total number of trace entries to be assigned. A handle is returned to address the particular trace buffer when adding trace entries. Valid handles are positive values in this example. A user defined formatting function can be invoked when printing the trace buffer. The name of the formatting routine is the same as the assigned trace buffer.

Similar to allocating a trace buffer, one or more log buffers may be allocated using, for instance, the following API: void *rasDefineLogArea (char const *formatName, int entrySize, int *errCode), in which formatName identifies the name of the log buffer; entrySize indicates the size of the entry; and errCode provides a non-zero address to return any error code.

The storage for the log buffer is assigned from the shared storage allocated in the initialization API. The process passes a character name up to, for instance, 63 characters in length and a request length in bytes. The API returns the address of the assigned area. A negative handle value indicates that the function call is unsuccessful.

In addition to the above, one or more other buffers may be allocated within the shared segment. For instance, in one embodiment, a shared segment buffer is allocated using the following API: void *rasDefineBuffer (const char *sharedSegName, int offset, int entrySize, const char *formatName, int *errCode). RasDefineBuffer defines an area of "entrySize" in the shared segment "sharedSegName" starting at "offset". The buffer is known by its "formatName", and error codes are written in the provided "errCode" variable. The buffer starting address is returned as "void*" by rasDefineBuffer( ).

Buffers defined in one process are to have unique "formatNames", even though they might be in different shared segments. Buffers defined in different processes can have the same "formatName". If entry size equals zero, then the actual size is set to be from the offset to the end of the shared segment.

Subsequent to allocating the buffers, the owning process and/or other processes may update the buffers. The updates place data in the buffers, including error data, should an error occur.

In one embodiment, a trace buffer is updated by a process invoking an update API, such as the following: int rasAddTraceEntry(void *traceHandle, void *traceEntry). The rasAddTraceEntry function adds the trace entry pointed to by traceEntry pointer to the buffer defined by the traceHandle returned by the rasDefineTraceArea function. The length of each entry is fixed and is defined at trace initialization. When a trace entry is added to the trace buffer, the rasAddTraceEntry function prefixes the entry with a timestamp.

The trace entry pointed to by the traceEntry pointer is previously written to by the process. The process determines what information is to be captured. This determination is based on many factors, including, for instance, its needs, information usable in addressing an error, etc. Then, when AddTraceEntry is invoked, the function moves the trace entry to the buffer.

The address of the user area of the next available trace entry is returned using the following function: void *rasGetNextTraceEntry (void *traceHandle, int *errCode). The entry is timestamped by the trace facility when the function is called. Because returning the address of the next entry leaves the trace buffer open to corruption, the trace facility verifies that entries written are the correct size on the next request for an entry or the next addition of an entry. The errCode parameter provides a non-zero address to provide a return code.

If the rasAddTraceEntry or rasGetNextTraceEntry detects the buffer has been corrupted, it will return an error code specifying the file has been corrupted. RasGetNextTraceEntry also returns a NULL pointer. The subsequent call to either aligns to the correct trace record boundary.

In addition to updating a trace buffer, an allocated log buffer may be updated by a process using the pointer returned at log initialization. The process adds to the log buffer any desired information, including error information, etc.

Data placed in the trace or log buffers may be written to external media. This writing to external media is referred to as dumping. The dumping creates one or more files (a.k.a., dump files). A dump can be triggered either internally by a process or externally (e.g., manual operation, system event, etc.). Dumped files are written to a subdirectory of the user's home directory, in, for instance, a file system As examples, each trace dump file includes the trace header and then the trace data. Each log dump file includes a 2 byte length filed which defines the log header length, then the header, then the log data. The headers are included to enable printtrace and printlog commands, described below, to print the files without using a summary file, also described below.

When a log or trace file is created, a unique file name is generated and added to a summary file. The summary file resides in the same directory as the user's log/trace files. Each record in the summary file includes, for instance: file name; date/time written; architecture of system where file is created (e.g., name of operating system); and a trace or log header defining the buffer parameters.

To write a trace buffer to external media, in one example, a dump trace buffer API is used. This includes, for instance, int rasDumpTrace (char const *traceName). The rasDumpTrace function writes the trace area, specified by traceName, to external media. TraceName can either specify a single trace buffer allocated by rasDefineTraceArea or a NULL, which causes each trace buffer assigned to the process performing the dump to be written to a unique file. In one example, the dump file name includes component name, subcomponent name, format name, processor id (PID) and a timestamp. The buffer is dumped in a binary format.

Similarly, a log buffer may be written to external media using, for instance, the following API: int rasDumpLog (char const *logName). The rasDumpLog function writes the requested log buffers to external media. LogName can either specify a single log buffer allocated by rasDefineLogArea or NULL, which causes each log buffer assigned to the process performing the dump to be written to a unique file. The file name includes, for instance, component name, subcomponent name, format name, processor id and timestamp. The buffer is dumped in binary format, as one example.

In addition to the dump APIs, logout APIs are also provided. For trace buffers, the logout APIs freeze the trace buffer(s) for the specified component and subcomponent names to obtain a snapshot of the buffer(s) at a particular point in time, and then, dump the frozen buffers(s). For log buffers, the logout APIs just perform the dump. Examples of these APIs are as follows: int rasLogout(char const *componentName, char const *subCompName, char const *description); and int rasLogoutbyPID (pid_t pid, char const *description).

Once frozen (for trace buffers), the specified function invokes the dump/formatting routines for the specified combination of component name and subcomponent name. By specifying "ALL" for the component name, the trace/log buffers for all the subcomponents of all the components are dumped. Similarly, by specifying a component name and "ALL" for subcomponents, all of the subcomponents of the particular component are dumped. Other examples also exist.

RasLogoutbyPID allows for logging out the trace and log buffers by specifying a process id (PID). It uses the registry to determine the component and subcomponent of the PID and invokes the rasLogout function. The description parameter of rasLogoutbyPID and rasLogout allows for a description to be saved in the summary record created for the dump files. This description is displayed as part of the summary information.

RasLogout can be invoked internally or by an external process. One embodiment of the logic associated with this function is described with reference to FIG. 5. Initially, the function sets a freeze flag in the header for each trace buffer to be logged out, STEP 500. In this example, log buffers are not frozen, just trace buffers.

Figure 5:
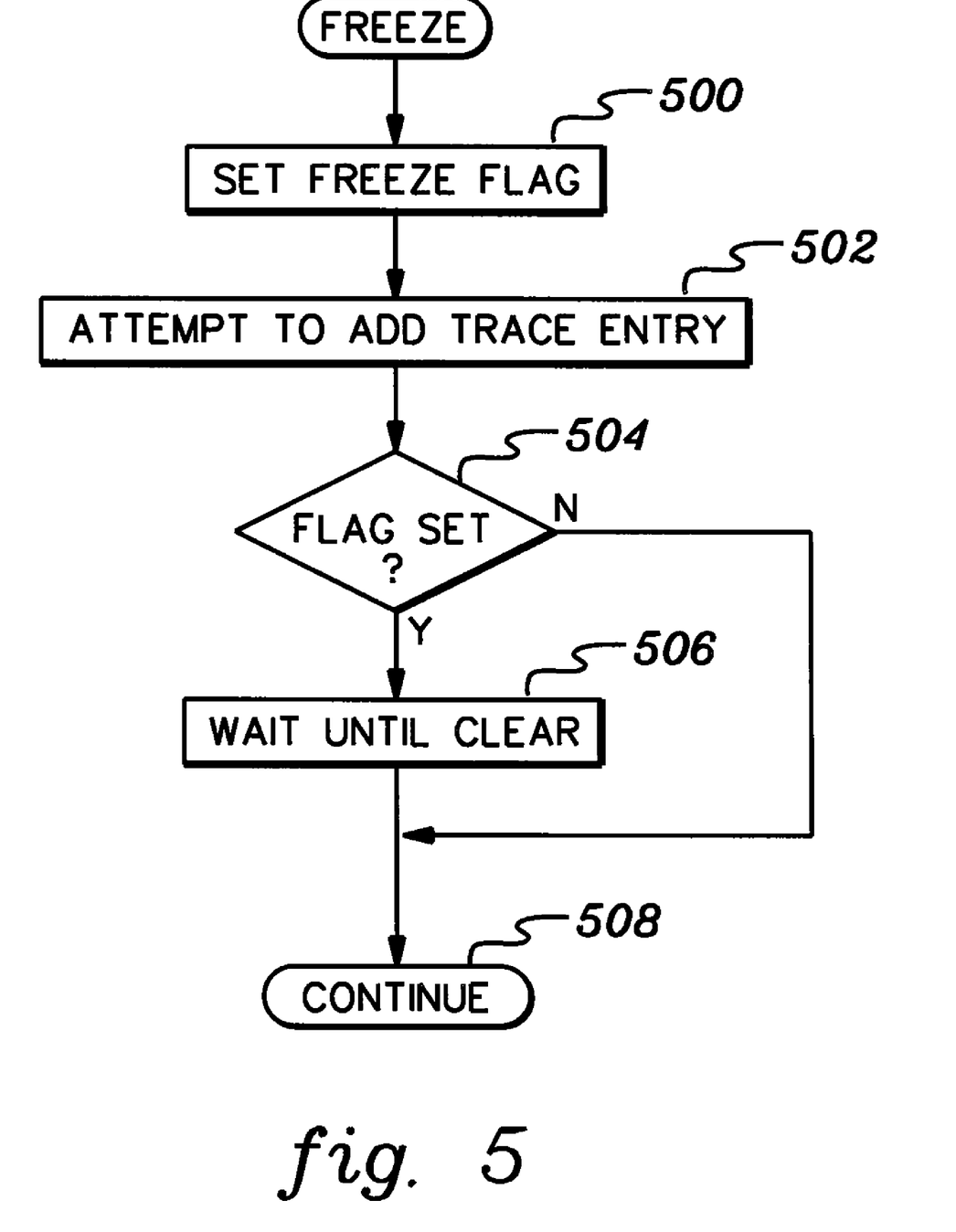
FIG. 5 depicts one embodiment of the logic associated with freezing a buffer, in accordance with an aspect of the present invention.

Thereafter, when rasAddTraceEntry or rasGetNextTraceEntry attempts to add a trace entry, STEP 502, and detects the "freeze" flag, INQUIRY 504, it waits for the freeze to clear, STEP 506. This prevents any further updates to the trace areas. Once the flags have been set, the rasDumpTrace and rasDumpLog functions are invoked for each requested area, in one embodiment. RasLogout then clears the freeze flag in each selected shared segment allowing the processes to continue processing, STEP 508.

Returning to INQUIRY 504, if the flag is not set, processing continues, STEP 508.

Another function that is provided is referred to as quick dump, which is invoked by using the following API: int rasQuickDump (void *buffptr, int size, char const *CompName, char const *SubCompName, char const *description, int tag). RasQuickDump dumps any defined storage area within a process. There is no check to determine if the address is valid. BuffPtr is a pointer that points to a buffer area to be dumped, and "size" specifies the size in bytes of that buffer to be dumped. The file name of the dumped file includes component name, subcomponent name, timestamp, processor id and a tag (e.g., desired identifying information). The description is printed with the architecture, size and tag information in the output of the rassummary command.

In addition to the above, various commands are provided that facilitate analysis of the data, including snapdump, rassummary, printtrace and printlog, each of which is described in further detail below.

The snapdump command, snapdump [-c componentName] [-s subCompName] [-d description] [-h], provides an external interface to dump log and trace buffers to external media. The buffers are dumped to separate files in a subdirectory of the user's home directory for processing by the printtrace and printlog commands. A snapdump record is written to a summary file, which ties together all log/trace buffers dumped as a result of the snapdump. An example follows:

Options:
None—Dump all components and their subcomponents.
-c: componentName—Dump specified component. If -s not specified, dump all subcomponents of the component.
-s: subCompName—Dump specified subcomponent of the specified component.

-d: description—Optional description entered on the command and displayed in the rassummary command.

-h: prints the help information (e.g., from UNIX man page).

Another command is the rassummary command, an example of which is as follows: rassummary [-s] [-h] [-d directory name]. The rassummary command displays log and trace buffers that have been dumped to external media or snapdump information, including the buffers. Its options include the following, as an example:

-s: display just the snapdump records.

-d: overrides the default directory allowing display of summary file in any directory.

-h: display help information.

An example of rassummary is as follows:

rassummary -s

[falcon9-grmorril]/gsa/pokgsa/home/g/r/grmorril/em/clean/emily: rassummary -s

| ID | Name |
|---|---|
| 0 | Snapdump: DUMP_ALL_EMILY_COMPONENTS_2007-03-28_11-41-58_422024 taken 2007-03-28 11:41:58 Console File: "/home/grmorril/z1090/logs/log_console_p291276_t2007-03-27_17-34-41.txt" Description: "NONE" |
| 1 | Snapdump: CPU_CPU_2007-03-28_15-24-38_270648 taken 2007-03-28 15:24:38 Console File: "/home/grmorril/z1090/logs/log_console_p299390_t2007-03-28_15-20-59.txt" Description: "Logs with core" |
| 2 | Snapdump: CPU_CPU_2007-03-28_15-30-47_262324 taken 2007-03-28 15:30:47 Console File: "/home/grmorril/z1090/logs/log_console_p299392_t2007-03-28_15-24-56.txt" Description: "Logs with core" |

Yet another command is the printtrace command, an example of which is: printtrace {filename|-s snapID -t file ids} -r[-d directory name] [-h]. The printtrace command prints the trace dump file or files if using the -s, -t options. If a formatting function with the same name as the log/trace buffer exists in the shared object library defined in the initialization, printtrace invokes the proper formatting routine for each trace record. If no formatting routine exists, the trace is printed in hexadecimal and character format. Examples of options for the printtrace command are provided, as follows:

-s: snapID option.

-t: trace files within -s to be printed. The -s combined with -t options are used to print multiple trace files in chronological sequence. The snapID parameter is obtained from executing the rassummary command. The snapID associates the log and trace buffers to a specific incident. Each associated log and trace file is assigned a sequential number to be used in the -t option.

-r—reverse the print direction. (new to old).

-d: overrides the default directory allowing printing of a trace file in any directory.

-h: display help information.

Another printing command is the printlog command, which is defined as follows: printlog filename [-d directory name] [-h]. The printlog command prints the specified log file name. If a formatting function with the same name as the log buffer exists in the shared object library defined in the initialization, printlog invokes a formatting routine for the log file. If no formatting routine exists, the trace is printed in hexadecimal and character format. Options for the printlog command are as follows:

-d: overrides the default directory allowing printing of a log file in any directory.

-h: display help information.

In one embodiment, log file management is also provided. A managelogs command, Managelogs {filename]} {-s snapid} {-t date} [-h], manages the trace and log buffers in a user's log directory, or the summary file, including those buffers. Because the emulator, in this example, may attempt to write the summary file while deletion is in progress, the emulator is inactive when the managelogs command is executed. The command provides the ability to remove summary file entries and the associated log and trace buffers. Summary records and associated files can be deleted by specifying the file name. All log/trace buffers associated with a snapdump can be deleted via the snapdump ID displayed by the rassummary command. All summary records and associated files older than "date" can be deleted with the -t option. The format of the data is, for instance, yyyy/mm/dd. The following options are provided as example:

filename: Delete the summary record and associated filename.

-s: remove all summary records and files associated with the snap ID.

-t: remove all summary records and files older than entered date.

-h: display help information.

To facilitate error analysis, in one example, a send error data script is provided that collects information to be sent to a support team. The support team can be a team internal to the organization using the facility or external thereof (such as a support team at IBM® supporting another organization). The script collects the log/trace data that is associated with the snapdump id for error analysis. The script provides the ability to display the snapdump data via rassummary commands; it sends snap data information to a particular website; send other requested information; creates machine specific information to help in debugging; and removes log and trace buffers via managelogs interface, as examples. The script compresses the data and provides the ability to transfer the data or write it to external media to be shipped to the support team.

As described above, formatting routines reside in the shared library specified on the rasInit function call. The name of the routine which formats the log or trace file is the name which defines the trace/log buffer on the rasDefineTrace and rasDefineLog functions.

The printtrace command, after formatting and printing the date/time of a trace record, calls the formatter for each record, if the formatter exists. If one does not exist, the data is printed in hexadecimal and character format. Printtrace passes the file pointer and the address of the trace record to the formatter. The formatter uses a command to display the passed trace record.

The following example shows the rasInit, rasDefineTrace calls, the trace record structure, the formatting routine and the output of the printtrace command.

The "TRACE2" formatter resides in a libformat.so shared object library. The routine is, as follows:

```
rc = rasInit("AWSTAPE", "TEST1" 20000, "libformat.so", 1);
tracehandle2 = rasDefineTraceArea ("TRACE2", 40, 48, &errCode);
struct trace {
    char userID[8];    /* User ID              */
    int id;            /* ID of the registry resource */
    pid_t pid;         /* Owning PID           */
    int maxCnt;        /* Maximum entry count  */
    int alcCnt;        /* Current entry count  */
    int lockID;        /* Registry lock        */
};
typedef struct trace traceRcd;
int TRACE2 (FILE *fileFP, traceRcd * tracePtr)
{
    fprintf (fileFP, "userid =%s, id = %d, pid = %08x, maxCnt = %08x, alcCnt = %08x, lockid = %08x\n",
        tracePtr->userID, tracePTR->id, tracePTR->pid,
        tracePtr->maxCnt, tracePtr->alcCnt, tracePtr->lockId);
    return(0);
}
printtrace
-f AWTAPE_TEST1_TRACE2-2006_08-05_09:43:18_0004211a
09:43:18.159478 userid=AWSTAPE,id = 84, pid=0004211a, maxCnt = 00000040, alcCnt = 00000003, lockid = 000003ff
09:43:18.159477 userid=AWSTAPE,id = 83, pid = 004211a, maxCnt = 00000040, alcCnt = 00000003, lockid = 000003ff
```

When the printlog command is issued, it calls the formatter once, if one exists, passing the file pointer and the address of the log buffer to the formatter. If one does not exist, the data is printed in hexadecimal and character format.

As described above, various APIs of a generalized interface facility are provided that enable the uniform collection and printing of data, including data for first occurrence errors. These APIs and associated capabilities are usable in a variety of processing environments, including emulated environments. In an emulated environment, emulated processes, such as emulated CPU processes, emulated I/O processes, as well as other processes, invoke the APIs in order to collect first error detection collection data in a uniform manner. One embodiment of the logic associated with collecting this data and providing this data, should an error be detected, is described with reference to FIGS. 6 and 7. Specifically, FIG. 6 describes data collection, and FIG. 7 describes error detection.

Figure 6:
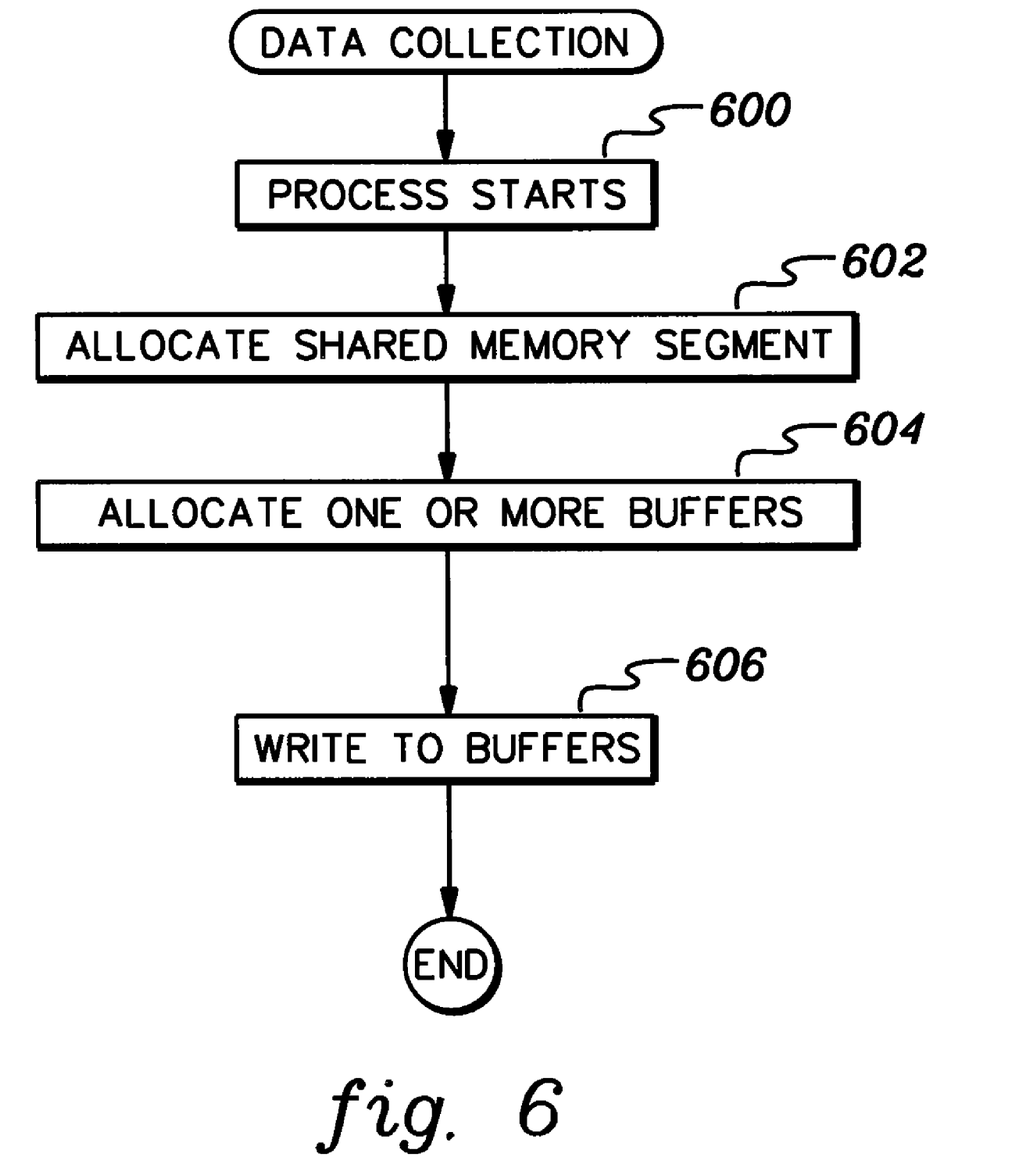
FIG. 6 depicts one embodiment of the logic associated with collecting data, in accordance with an aspect of the present invention.

Referring to FIG. 6, as part of initialization of a process, such as an emulator process, STEP 600, the process defines and allocates a shared memory segment, STEP 602. This is accomplished by invoking the rasInit function described above. By invoking this function, a storage segment of the user specified size is provided.

Thereafter, the process allocates one or more buffers, STEP 604. The number and type of buffers (e.g., trace buffers, log buffers) are customizable by the process. These buffers are allocated using the define trace area or define log area functions described above, and thus, they are defined uniformly (although may be different sizes).

Once the memory segment and buffers are allocated, then the process can write data to those buffers. For example, the process collects data, as specified by the process, and then moves that data to the buffers, when desired (e.g., detection of an error).

When an error is detected or at other defined times, a process writes the data to disk, and optionally, sends it to a support team. This is described further with reference to FIG. 7.

Figure 7:
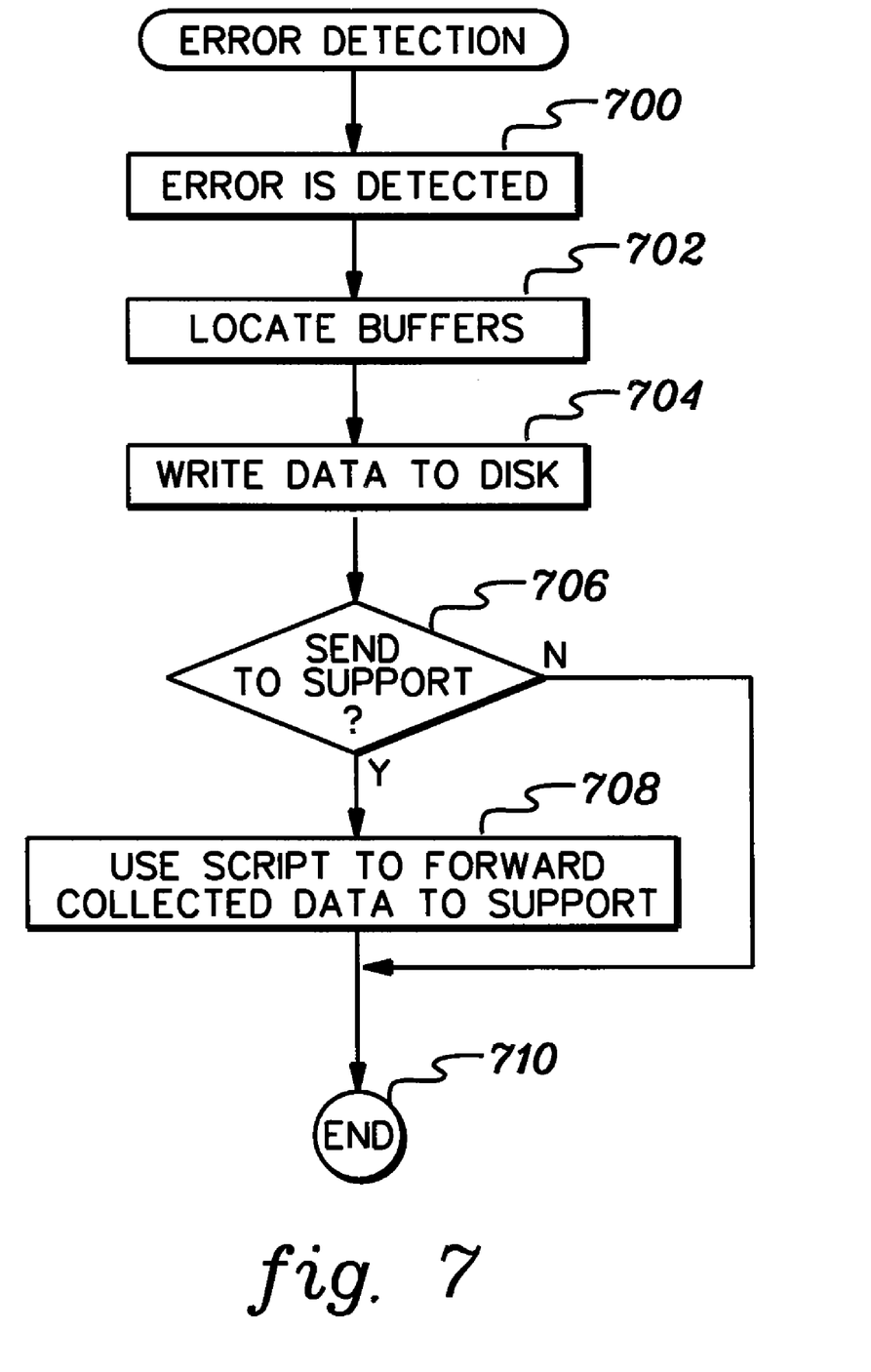
FIG. 7 depicts one embodiment of the logic associated with error detection, in accordance with an aspect of the present invention.

Referring to FIG. 7, in response to detecting an error, STEP 700, the appropriate buffers are located, STEP 702. In one example, this is performed using the registry that tracks the process' segments and buffers. Subsequent to locating the buffers, the data of those buffers are written to disk, using, for instance, DumpTrace or other functions, STEP 704.

Further, a determination is made as to whether that data should be sent to a support team, INQUIRY 706. If it is desired to send the data to the support team, the senderrdata script is used to forward the collected data to that support team, STEP 708. In one example, this data is sent electronically (e.g., e-mail, internet). Thereafter, or if the data is not to be sent to support, then processing is complete, STEP 710.

Described in detail above is a capability to facilitate collection of first error detection data in a uniform manner. A generalized interface facility is provided that includes standard APIs or functions to be used by the various processes (or other users) to capture and provide data. By using the generalized facility, each process (even those of different types) use the same commands and generalized formats to capture and/or print or otherwise provide the data. This facilitates collection and analysis of the data.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 8:
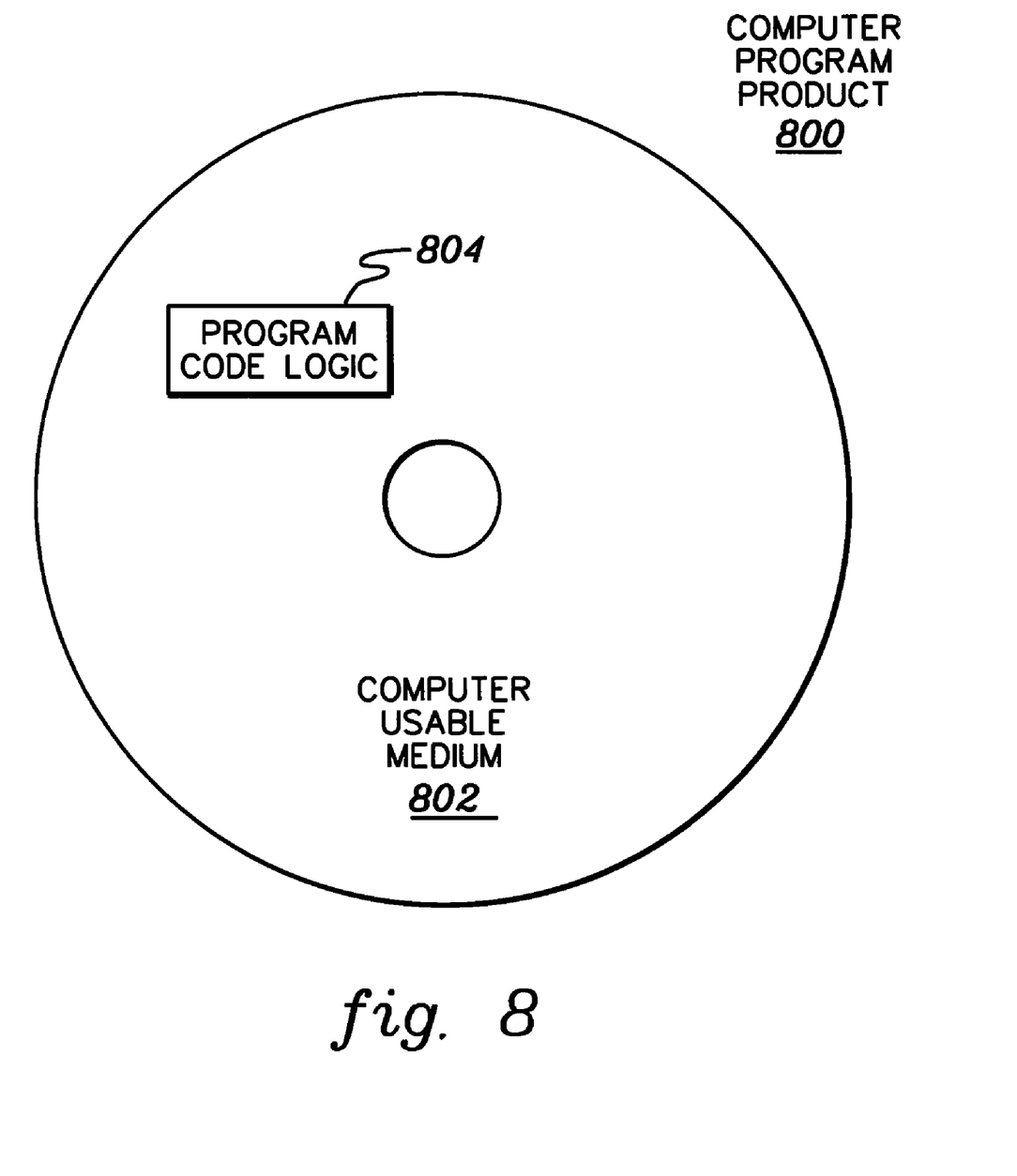
FIG. 8 depicts one embodiment of a computer program product incorporating one or more aspects of the present invention.

One example of an article of manufacture or a computer program product incorporating one or more aspects of the present invention is described with reference to FIG. 8. A computer program product 800 includes, for instance, one or more computer usable media 802 to store computer readable program code means or logic 804 thereon to provide and facilitate one or more aspects of the present invention. The medium can be an electronic, magnetic, optical, electromagnetic, infrared, or semiconductor system (or apparatus or device). Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, data associated with the first occurrence of an error is collected. Further, this data is collected in a uniform manner and uniformly outputted, thereby facilitating analysis of the data. In particular, the same commands are used to print the traces and logs, regardless of the process that wrote the data or is printing the data. For instance, if two processes capture data relating to an error, this data will be collected in a uniform manner and timestamped. In one example, a merge function may be used to print the data in time sequence. This facilitates the analysis process and substantially decreases the amount of time needed to analyze errors. Further, by collecting the data on the occurrence of the first error, the chance of losing data or not being able to recreate the data are eliminated.

Advantageously, a generalized interface facility that includes a plurality of APIs is provided. A process requests a shared storage segment using a component name, subcomponent name, the size of the buffer and an optional shared library which includes formatting routines for the log and trace buffers. Any number of log and trace areas can be defined within the acquired shared storage. The combination of component and subcomponent name is unique and is registered in a registry segment. This registry allows the accessing of the defined segments by other processes (e.g., dump, man-op, system event, etc.) to dump the trace/log buffers to external media.

The trace buffer(s) are defined by specifying the number of requested entries, the size of each entry and a unique name for the area. This name also defines the optional formatting routine in the shared library to be used to format the trace when printing. The process can define multiple trace buffers within the acquired shared segment. A unique handle is returned to the process which is used by the APIs to update the trace buffer. The trace buffers are managed as circular buffers with each entry timestamped as it is written to the buffer. The timestamp allows merging of multiple trace buffers when displaying the dumped data. APIs exists to update the trace area using the returned handle or to obtain the address of the next entry to be updated.

The log buffer(s) are defined specifying a unique name for the buffer and the size of the requested buffer. This name also defines the optional formatting routine in the shared library to be used to format the log when printing. The log buffer(s) is not managed by the facility. As with the trace buffers, the process can define multiple log buffers within the acquired shared segment and a unique handle is returned for each buffer. The log buffer simply provides an area for a process to store process independent debug information.

Logout APIs exist that can be triggered internally or externally using the component/subcomponent names. Files are written in a log directory (e.g., external media) allocated under the user-id running the z/Emulator. When a log or trace buffer is dumped, a unique file name is generated using the component/subcomponent, process ID and date/time of the dump. The buffers are dumped in binary format. The file name is added to a summary file in the log directory which tracks the dumped files.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Further, the environment may include more than one processor. Moreover, operating systems other than those mentioned herein can be used. Further, the processing environment can emulate environments other than the z/Architecture®. Yet further, the architected features may be those of other architectures. Additionally, various emulators can be used. Emulators are commercially available and offered by various companies. Additional details relating to emulation are described in *Virtual Machines: Versatile Platforms For Systems and Processes* (*The Morgan Kaufmann Series in Computer Architecture and Design*), Jim Smith and Ravi Nair, Jun. 3, 2005, which is hereby incorporated herein by reference in its entirety. Yet further, the processing environment need not include emulator code. Many other types of processing environments can incorporate and/or use one or more aspects of the present invention.

Further, although examples of storage segments are shown with allocated buffers, these are only examples. Storage segments may have more, less or a different variety of buffers. For instance, a segment may be defined with only trace buffers, only log buffers or a combination thereof. Moreover, other, more or less functions may be included in the generalized interface facility. Yet further, the functions may include more, less or different parameters. Still further, the script or other functions may include more, less or different tasks to be performed.

Moreover, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for facilitating data collection in a processing environment, the computer program product comprising:
    a storage medium readable by a processing circuit and storing instructions for execution by the processing circuit to perform a method comprising:
        preparing for data collection in the processing environment, the processing environment comprising multiple different types of processes; and
        collecting data by the multiple different types of processes executing within the processing environment, said data including data relating to a first occurrence of an error, wherein said collecting comprises employing by each process of the multiple different types of processes a generalized interface facility that enables uniform collection of the data regardless of the type of process of the multiple different types of processes collecting the data.

2. The computer program product of claim 1, wherein the preparing comprises allocating, by each process of the multiple different types of processes, one or more buffers to be used in collecting the data.

3. The computer program product of claim 2, wherein the one or more buffers are defined by each process in a uniform manner, but are customizable by the process, wherein at least one of a size of a buffer and a number of entries of the buffer are established at the time the buffer is allocated and are defined by the process.

4. The computer program product of claim 2, wherein the allocating comprises allocating one or more trace buffers for the process, said allocating a trace buffer comprising for the process:
defining by the process a number of entries to be included in the trace buffer; and
defining by the process a size of the entries, wherein the size of the entries is a uniform size for all entries of the trace buffer.

5. The computer program product of claim 2, wherein the collecting comprises writing data to the one or more buffers.

6. The computer program product of claim 5, further comprising providing a timestamp of the data, in response to including the data in the one or more buffers.

7. The computer program product of claim 2, wherein the preparing further comprises allocating, by each process of the multiple different types of processes, a shared segment for the process, said shared segment comprising the one or more allocated buffers.

8. The computer program product of claim 7, wherein the method further comprises tracking the allocated shared segment of one process to enable one or more other processes of the multiple different types of processes access to the shared segment.

9. The computer program product of claim 1, wherein the method further comprises automatically writing the collected data to one or more external media, in response to the multiple different types of processes terminating.

10. The computer program product of claim 9, wherein the method further comprises maintaining a summary of the data written to the one or more external media.

11. The computer program product of claim 2, wherein the allocating one or more buffers comprises allocating, by each process of the multiple different types of processes, one or more log buffers for use by the process in collecting data.

12. The computer program product of claim 1, wherein the method further comprises printing the collected data using a command, the command being the same regardless of the process of the multiple different types of processes printing the data.

13. The computer program product of claim 12, wherein the printing automatically prints the data in a format previously defined by the process, wherein the format defined by the process can differ from a format defined by another process of the multiple different types of processes.

14. The computer program product of claim 1, further comprising forwarding the collected data to a support team for analysis, said forwarding using a script of the generalized interface facility.

15. The computer program product of claim 1, wherein the multiple different types of processes comprise multiple different types of emulated processes of an emulated processing environment.

16. A method of facilitating data collection in a processing environment, said method comprising:
preparing for data collection in the processing environment, the processing environment comprising multiple different types of processes; and
collecting data by the multiple different types of processes executing within the processing environment, said data including data relating to a first occurrence of an error, wherein said collecting comprises employing by each process of the multiple different types of processes a generalized interface facility that enables uniform collection of the data regardless of the type of process of the multiple different types of processes collecting the data.

17. The method of claim 16, wherein the preparing comprises allocating, by each process of the multiple different types of processes, one or more buffers to be used in collecting the data, and wherein the one or more buffers are defined by each process in a uniform manner, but are customizable by the process, wherein at least one of a size of a buffer and a number of entries of the buffer are established at the time the buffer is allocated and are defined by the process.

18. The method of claim 17, wherein the allocating comprises allocating one or more trace buffers for the process, said allocating a trace buffer comprising for the process:
defining by the process a number of entries to be included in the trace buffer; and
defining by the process a size of the entries, wherein the size of the entries is a uniform size for all entries of the trace buffer.

19. The method of claim 17, wherein the preparing further comprises allocating, by each process of the multiple different types of processes, a shared segment for the process, said shared segment comprising the one or more allocated buffers.

20. The method of claim 19, further comprising tracking the allocated shared segment of one process to enable one or more other processes of the multiple different types of processes access to the shared segment.

21. The method of claim 16, further comprising automatically writing the collected data to one or more external media, in response to the multiple different types of processes terminating.

22. The method of claim 21, further comprising maintaining a summary of the data written to the one or more external media.

23. The method of claim 16, further comprising printing the collected data using a command, the command being the same regardless of the process of the multiple different types of processes printing the data.

24. The method of claim 16, further comprising forwarding the collected data to a support team for analysis, said forwarding using a script of the generalized interface facility.

25. The method of claim 16, wherein the multiple different types of processes comprise multiple different types of emulated processes of an emulated processing environment.

26. A computer system for facilitating data collection in a processing environment, the computer system comprising:
a memory; and
a processor in communications with the memory, wherein the computer system is configured to perform a method, said method comprising:
preparing for data collection within the processing environment, the processing environment comprising multiple different types of processes; and collecting data by the multiple different types of processes executing within the processing environment, said data including data relating to a first occurrence of an error, and wherein said collecting comprises employing by each process of the multiple different types of processes a generalized interface facility that enables uniform collection of the data regardless of the type of process of the multiple different types of processes collecting the data.

27. The computer system of claim 26, wherein the preparing comprises allocating, by each process of the one or more different types of processes, one or more buffers to be used in collecting the data, the one or more buffers being defined by each process in a uniform manner, but customizable by the process, wherein at least one of a size of a buffer and a number of entries of the buffer are established at the time the buffer is allocated and are defined by the process.

28. The computer system of claim 26, further comprising automatically writing the collected data to one or more external media, in response to the multiple different types of processes terminating.

29. The system of claim 26, wherein the method further comprises printing the collected data using a command, the command being the same regardless of the process of the multiple different types of processes printing the data.

* * * * *